May 16, 1939.  P. MATHEWS  2,158,880
PARALLEL CIRCUIT CONTROL
Filed Jan. 22, 1938
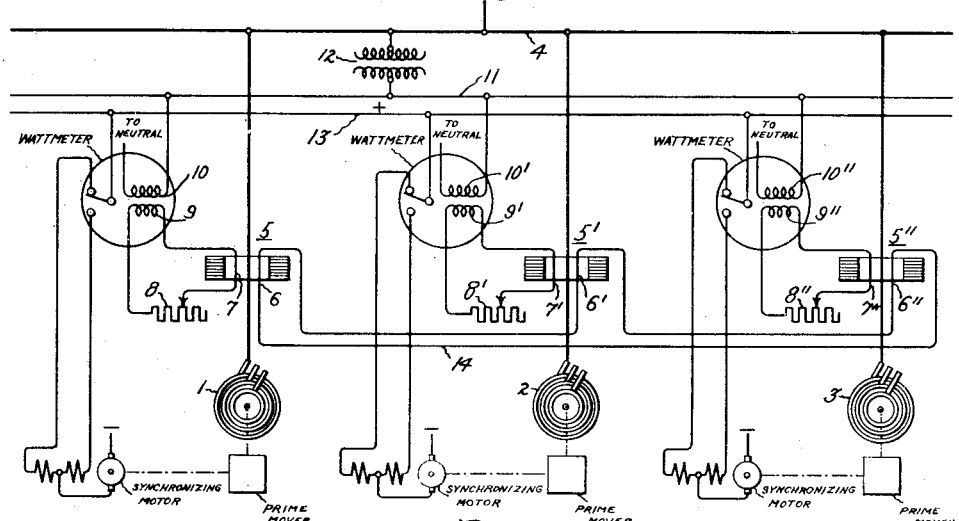
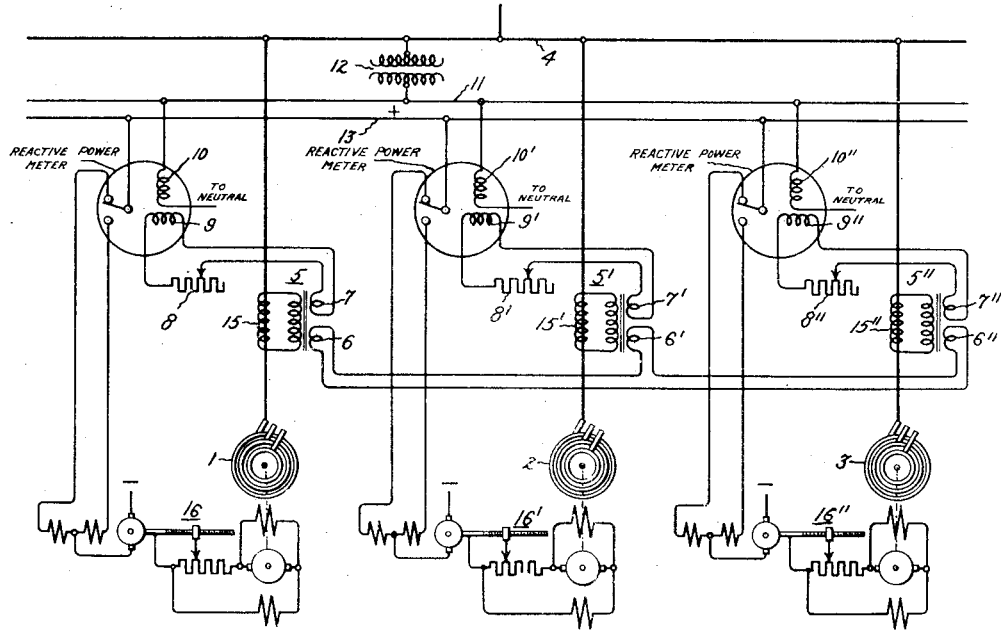
Inventor:
Paul Mathews,
by Harry E. Dunham
His Attorney.

Patented May 16, 1939

2,158,880

UNITED STATES PATENT OFFICE 2,158,880

PARALLEL CIRCUIT CONTROL

Paul Mathews, Rugby, England, assignor to General Electric Company, a corporation of New York Application January 22, 1938, Serial No. 186,380
In Great Britain August 5, 1937

4 Claims. (Cl. 171—119)

This invention relates to parallel circuit control and more particularly to the control of the distribution of output of parallel connected alternating current generators.

It is frequently desired to provide a plurality of alternating current generators connected in parallel to supply a variable load. In such an arrangement it is usually required that the generators, assuming them to be of equal capacity, should divide the load equally between them. In order that the generators may be so regulated as to equalize and maintain equal their respective outputs, it is necessary to provide apparatus for responding to the output of each generator.

It is an object of the present invention to provide such apparatus in a simple and convenient manner.

It is another object of the invention to provide simple and inexpensive means for causing individual standard two coil wattmeter type devices to respond directly to the differences between the power output of each generator and the average power output of all the generators.

According to one form of the invention, a separate current transformer is associated with each generator. Each transformer has its primary winding connected in the load circuit of its associated generator and it has two secondary windings. One of the secondary windings is connected in series additive relation with the corresponding secondary windings of the remaining current transformers. The other is connected to the current winding of a wattmeter for the appropriate generator.

For manual control, indicating wattmeters are used but for automatic control the indicating wattmeters are replaced by wattmeter relays of the center zero type, having contacts which, when closed, are adapted to complete a control circuit for either raising or lowering the speed of the generators. If the output of any generator is above or below the average output of all the generators, the speed of its prime mover is adjusted to restore the output of the generator to the average value.

Preferably, in carrying out the invention, the circuit which connects the appropriate secondary winding of each transformer to the current winding of the wattmeter or relay contains a balancing resistor.

The invention will be better understood from the following description taken in connection with the accompanying drawing and its scope will be pointed out in the appended claims.

In the accompanying drawing, Fig. 1 shows diagrammatically an arrangement embodying the invention, and Fig. 2 is a modification.

Referring now to Fig. 1, which is shown single phase, one line, for the sake of simplicity, alternating current generators 1, 2, and 3 are connected in parallel to supply a load circuit indicated at 4. The output circuit of the generator 1 contains the primary winding of a current transformer 5 having two secondary windings 6 and 7. The secondary winding 7 is connected through a balancing resistor 8 to the current winding 9 of a wattmeter relay of the center zero type, the voltage winding 10 being connected to an auxiliary busbar 11, the potential on which is derived from the common load circuit 4 through the potential transformer 12. An auxiliary direct current supply circuit 13, to which is connected the moving contact of the relay, supplies energy for controlling the generator output through governor adjustment of its prime mover, in a well known manner.

Similar current transformers, relays and connections are provided for the generators 2 and 3, the corresponding elements being indicated by the same reference numerals with primes and double primes respectively.

The secondary windings 6, 6', and 6" are connected in a series additive circuit 14.

The operation of Fig. 1 is as follows: Assume first of all the simplest case in which machines 1, 2, and 3 are triplicates and transformers 5 are triplicates and that the number of turns of the "6" windings of the transformers are the same as the number of turns of the primary windings of the transformers, and further that each of the generators is carrying the same constant load at unity power factor. The current in the three secondary windings 6, 6' and 6" must obviously be the same because these windings are all connected in series. From the well-known fact that the primary load ampere-turns of a transformer must equal the secondary load ampere-turns, it therefore follows that the current in each of the secondaries 7, 7', and 7" will be the same. The relative values of the currents in the secondary windings 6 and 7 will be inversely proportional to the impedances of their circuits. As the circuit containing the windings 6 consists merely of the leads connecting these windings, whereas the circuits of the windings 7 contain the resistor 8 and the winding 9, the impedances of the circuits of the windings 7 are much greater than the impedance of the circuit containing the windings 6 and as a practical matter these impedances may be so proportioned and the relative number of turns of the windings 6 and 7 may be so selected that under the above assumed conditions the current in the windings 6 is substantially the same as the current flowing in each of the machines and the current flowing in the windings 7 will be substantially zero. The contact-making wattmeters will therefore be in their zero center positions and each of the generators will continue to supply the same amount of power.

Assume now that generator 1 begins to carry less than one-third of the total load. Under these conditions the current in the series circuit containing the secondary windings 6, 6', and 6" will decrease because it can be shown that this current is the average current of all the machines. The current in the secondary winding 6 will therefore be more than the current in machine 1, while the current in the secondaries 6' and 6" will be less than the current in the machines 2 and 3. These conditions will cause currents to flow in the secondary windings 7, 7' and 7" in order to maintain equality of primary and secondary load ampere-turns. In each case these currents will be the difference between the primary current and the current in the series connected secondary winding. As the current in the secondary winding 6 is greater than the current in the machine 1, the current in the winding 7 will be a negative current, that is to say, it will be in phase opposition to the current in the secondary winding 6. However, as the current in the windings 6' and 6" is less than the current in the machines 2 and 3, the current in the secondary winding 7' and 7" will be positive, that is to say, in phase with the current in the windings 6' and 6", because it adds to this current instead of subtracting from it as in the case of the current in winding 7.

As all of the voltage windings 10, 10' and 10" of the wattmeter relays respond to the same voltage, the difference in phase of the current in wattmeter 9, supplied by secondary winding 7, with respect to wattmeter current coils 9' and 9", supplied by secondary windings 7' and 7" respectively, will cause opposite indication or response of these meters. Thus, the wattmeter associated with machine 1 may be so connected that it will close its raise contacts, while the other two wattmeters will close their lower contacts. This will cause operation of the respective synchronizing motors of the prime movers so as to raise the power output of machine 1 and lower the power outputs of machines 2 and 3. This action will, of course, continue until the outputs of all three machines are again equal, for only under these conditions will there be zero current in the current coils of all of the wattmeters.

From what has been said before, it, of course, follows that if the output of machine 1 increases above the average, the wattmeter associated with machine 1 will close its lower contacts and the wattmeters associated with machines 2 and 3 will close their raise contacts, thereby to cause the governor controls of the prime movers for the machines to co-operate in such a manner as to re-establish an equal division of load.

Of course, as a practical matter the number of turns of the secondary windings 6, 6', and 6" will be much greater than the number of turns of the primary windings of the transformers because it would be uneconomical to have the control circuits carry currents equal to the main power currents. However, so long as the ratios of primary turns to turns of the windings 6, 6' and 6" are all the same, the primary ampere-turns will equal the ampere-turns of the "6" windings whenever the load carried by each of the generators is the same.

If the transformer ratios are not the same, the load division between the generators will be correspondingly different. Thus, for example, if secondary winding 6 has half as many turns as secondary windings 6' and 6", the regulating system will automatically cause machine 1 to carry half as much load as each of the other two machines.

Changes in total real load will not affect the system, the current in the series circuit 14 changing in proportion to the average load change and thus holding the desired load distribution. Similarly, changes in the direction of load or power flow will not affect the system and it will hold any division of motoring load as well as generating load.

Inequalities in voltage between machines 1, 2, and 3 will cause wattless currents to circulate in these machines but as these currents are mere circulating currents and do not go outside the system, their vector sum will be zero and they will have no effect on the average current. Consequently, the current in the series circuit containing the secondary windings 6, 6' and 6" will be independent of these circulating currents. This, of course, means that whenever there is a change of wattless current in any of the machines 1, 2, and 3, all this change will be reflected in the current in the secondary windings 7, 7', and 7", but as these currents are wattless currents they will have no effect on the real power responsive wattmeters.

From this it also follows that changes in load power factor at constant load in watts, will not affect the system.

In Fig. 2, the circuit is adapted for controlling reactive power and a modified current transformer arrangement is provided because in some circuits it is undesirable to insert 3-winding current transformers directly in the power circuits.

Thus, conventional 2-winding current transformers 15, 15' and 15" are connected in the parallel circuits supplied by the generators 1, 2, and 3 respectively and the 3-winding current transformers 5, 5' and 5" may then be made relatively small-sized instrument transformers.

The meters have been changed from real power responsive wattmeters to reactive power meters by shifting through 90 degrees the angular relation between the current winding 9 and the potential winding 10.

As reactive power does not involve any real power in watts, it is not controlled by changing the output of the prime movers as in Fig. 1, but, on the contrary, it may easily be controlled by changing the voltage of the generators 1, 2, and 3. This may readily be done in a conventional manner by means of ordinary motor-operated rheostats 16, 16', and 16", the motors of which are controlled exactly the way the synchronizing motors for the prime movers in Fig. 1 are controlled.

The operation of Fig. 2 is similar to that of Fig. 1 except that the reactive power meters respond only to variations in quadrature component currents of the machines 1, 2, and 3. Thus, if the desired distribution of reactive power between the machines changes for any reason, the reactive power meter associated with the machine carrying too much reactive power will cause a reduction in reactive power, whereas the reactive power meter or meters associated with any machine or machines carrying too little reactive power will automatically cause changes in excitation so as to result in an increase of reactive power.

Such an arrangement is useful for automatically equalizing voltages and eliminating wasteful circulating currents.

While there are shown and described particular embodiments of the invention, it is obvious to those skilled in the art that changes and modifications can be made therein without departing from the invention and therefore it is aimed in the appended claims to cover all such changes and modifications without departing from the true spirit and scope of the invention.

What I claim as new and desire to secure by Letters Patent of the United States, is:

1. In combination, a plurality of parallel connected alternating current circuits, a separate transformer associated with each of said circuits, each of said transformers having a primary winding and two secondary windings, each of said primary windings being connected to carry a current corresponding to the current in its associated circuit, a circuit containing one secondary winding of each of said transformers serially connected therein, separate electro-responsive devices which have an operating winding, and circuit connections for connecting each of said windings to a different one of the remaining secondary windings independently of the other secondary windings.

2. In combination, a plurality of parallel connected alternating current circuits, a separate transformer associated with each of said circuits, each of said transformers having a primary winding and two secondary windings, each of said primary windings being connected to carry a current corresponding to the current in its associated power circuit, a circuit containing one secondary winding of each of said transformers serially connected therein, separate electro-responsive devices associated with each transformer, each of said devices having a current coil connected to the remaining secondary winding of its associated transformer independently of the other secondary windings, and a separate potential coil on each of said electro-responsive devices connected to respond to the common voltage of said parallel connected power circuits.

3. In combination, a plurality of parallel connected alternating current circuits, a separate transformer associated with each of said circuits, each of said transformers having a primary winding and two secondary windings, each of said primary windings being connected to carry a current corresponding to the current in its associated power circuit, a circuit containing one secondary winding of each of said transformers serially connected therein, separate wattmeters associated with each of said transformers, said wattmeters having their potential windings connected to respond to the voltage of said parallel circuits and having their current coils connected to the remaining secondary windings of their associated transformers, the circuits of said current coils being conductively independent of each other.

4. In combination, a plurality of parallel connected alternating current circuits, a separate generator for each of said circuits, a separate transformer associated with each of said circuits, each of said transformers having a primary winding and two secondary windings, each of said primary windings being connected to carry a current corresponding to the current in its associated power circuit, a circuit containing one secondary winding of each of said transformers serially connected therein, separate contact-making wattmeters associated with each of said transformers, said wattmeters having their potential windings connected to respond to the voltage of said parallel circuits and having their current coils connected to the remaining secondary windings of their associated transformers, the circuits of said current coils being conductively independent of each other, and means controlled by said watt-meters for varying the power output of said generators.

PAUL MATHEWS.